United States Patent Office 2,803,614
Patented Aug. 20, 1957

2,803,614

TIN COMPOUND AS A CURING AGENT FOR ORGANOPOLYSILOXANES

Myer M. Solomon, Albany, N. Y., assignor to General Electric Company, a corporation of New York No Drawing. Application March 15, 1954,
Serial No. 416,413

20 Claims. (Cl. 260—29.4)

This invention is concerned with curing organopolysiloxanes and more particularly relates to the curing of these organopolysiloxanes by means of a curing agent comprising stannous gluconate or complexes thereof.

Various metallic salts including wholly inorganic or organo-metallic salts have been employed in the past for curing various organopolysiloxane resins and organopolysiloxane fluids. Thus, in Welsh Patent 2,449,572 issued September 21, 1948, there are disclosed a large number of organic salts of various organic acids, particularly monocarboxylic acids which have been found to be effective for curing organopolysiloxane resins. Although these organometallic salts described in the aforesaid Welsh patent are effective for curing the resins, nevertheless they are subject to certain disadvantages. In the first place, they are water-insoluble and thus incompatible with an aqueous medium. Hence, attempts to use such a heterogeneous system in aqueous media result in a non-uniform application, giving unsatisfactory cured resinous surfaces with resultant inferior properties. Despite the desirability of using water-soluble curing agents for the organopolysiloxane, no such curing agent has heretofore been available which is known to cure organopolysiloxane systems satisfactorily when pH's of 7 or above are employed in the emulsion or dispersion. Thus, water-soluble curing agents such as stannous sulfate, zirconium oxychloride, etc., when employed as curing agents in aqueous systems, will become inactive due to the precipitation of the respective oxide derived from the curing agent when the pH is as low as 5 or above. This has seriously limited the use of previously employed water-soluble curing agents.

The advantage of being able to use a water-soluble curing agent for organopolysiloxane resins and, in particular organopolysiloxane fluids, over a wide pH range has become quite important recently as a result of the emergence of organopolysiloxanes for treating various textiles, leather, and other cellulosic materials to render them water repellent; or to improve the anti-blocking or antisticking properties of cellulosic materials such as paper, cardboard, etc., when the latter are employed in making containers or packages which come in direct contact with materials which normally adhere thereto. This importance of the curing agent is due to the fact that in such treatment of textile or cellulosic materials, etc., water dispersions or emulsions are widely used as the treating medium and it is extremely advantageous to have as many of the active ingredients in the treating mixture be water-soluble for ease of handling and for optimum results.

I have now discovered that a certain organometallic salt is extremely water-soluble, and can be effectively employed to cure various organopolysiloxane resins and fluids over a wide range of temperatures, and that the use of this organo-metallic salt can also be used over a wide pH range, ranging from acid to alkaline pH's. Even when employed in non-aqueous media, for instance, in organic solutions of organopolysiloxane fluids or resins which are curable by other organo-metallic salts, I have found that the rate of cure obtained when this specific organo-metallic salt is employed is rapid, and one is able to obtain cured films and products comparable in properties to those obtained by using other curing agents for the same purpose. All the foregoing desired features of the curing system are attainable by employing as the curing agent a specific tin salt, namely, stannous gluconate or water-soluble complexes thereof.

The fact that stannous gluconate or complexes thereof were effective as a curing agent for the organopolysiloxane fluids or resins (hereinafter these fluids and resins will be designated as "organopolysiloxanes") was entirely unexpected and in no way could have been predicted because a very similar salt, namely, stannic gluconate exerted no apparent curing effect on these organopolysiloxanes.

The organopolysiloxanes employed in the practice of the present invention using the stannous gluconate or complexes thereof as a curing agent include those which are capable of being cured by the usual organo-metallic salts as described in the above-mentioned Welsh patent, and include both organopolysiloxane resins and fluids containing an average of from about 1.0 to 2.05 organic groups per silicon atom. The organopolysiloxane fluids referred to herein are those generally which are fluid and stable (resistant to increase in viscosity) at normal temperatures (25° to 30° C.) and which do not need a solvent to be liquid at such temperatures. These organopolysiloxane fluids are in counter distinction to the usual resinous organopolysiloxanes which are usually solid at room temperature, and in the absence of a solvent are unstable and will continue to condense or polymerize to a more advance state of cure.

Among the organopolysiloxanes which may be employed in this invention are those which, in addition to having silicon-bonded organic groups, also have silicon-bonded hydrogen groups as, for instance, those having a general formula $$(R)_x H_y SiO_{\frac{4-x-y}{2}}$$

where R is a monovalent hydrocarbon radical (e. g., alkyl, aryl, aralkyl, alkaryl, etc.), preferably a monovalent lower alkyl radical (e. g., methyl, ethyl, propyl, etc.), $x$ has a value from 1.0 to 1.5, $y$ has a value from 0.7 to 1.25, and the sum of $x$ and $y$ has a value from about 2.0 to 2.25 inclusive. These organohydrogen polysiloxanes may contain traces of hydroxy radicals due to the incomplete condensation of the silicols obtained as a result of hydrolysis of intermediate organohydrogen hydrolyzable silanes, for instance, methyldichlorosilane. These organohydrogen polysiloxanes may be either cyclic or linear polymers. The linear polymers may be chain stopped with trimethylsilyl groups or even with diorganohydrogen silyl units, as for instances, units having the formula $$(CH_3)_3SiO—$$

or $$(CH_3)_2HSiO—$$

Examples of such organohydrogen polysiloxanes may be found, for instances, in Sauer Patents 2,595,890–891, in Wilcock Patent 2,491,843, and in Barry Patent 2,590,812.

A still further class of organopolysiloxanes which may be employed in the present invention comprises compositions having the formula $$(R_m SiO_n)_x$$

where $x$ is an integer greater than 1, R represents an organic radical, for instance, a monovalent hydrocarbon radical advantageously selected from the class consisting of monovalent alkyl and monovalent aryl radicals, $m$ is a number less than 2 and not less than approximately 0.5, and $n$ is a number more than 1 and not more than approximately 1.8, the silicon atoms in the organopolysiloxane being linked to the oxygen atoms and the organic radicals being attached to the silicon atoms. If desired, organopolysiloxanes may be employed where $n$ has a value greater than 1.8, for instance, as high as 1.95, but it will be found that such organopolysiloxanes cure somewhat slower than those within the range of 1 to 1.8. In all the aforementioned formulas, R may be, for example, an alkyl radical (e. g., methyl, ethyl, propyl, butyl, isobutyl, amyl, hexyl, etc.), aryl radical (e. g., phenyl, diphenyl, naphthyl, anthracyl, etc.), alkaryl radical (e. g., toyl, xylyl, ethylphenyl, etc.), aralkyl radical (e. g., benzyl, phenylethyl, etc.), a cycloaliphatic radical (e. g., cyclopentyl, cyclohexyl, cyclohexenyl, cyclopentadienyl, etc.), and unsaturated aliphatic radical (e. g., vinyl, allyl, methallyl, ethinyl, butadienyl, etc.), etc. The presence of halogens, for example, chlorine, fluorine, etc., on the organic radicals particularly on the aryl radicals is not precluded. Preferably R is either the methyl or phenyl radical. Obviously, it will be apparent to those skilled in the art that different types of organic radicals may be attached to the same silicon atom or may be present in the organopolysiloxane molecule, as, for instance, both methyl and phenyl radicals, both methyl and ethyl radicals, both ethyl and phenyl radicals, etc. Additional examples of organopolysiloxanes coming within the scope of this particular class of materials may be found described in Rochow patents U. S. 2,258,218–222.

An organopolysiloxane fluid which has been used successfully for water-repellent and release purposes in combination with the stannous gluconate comprises a polymerizable, fluid, intercondensed product of hydrolysis of a mixture of methylchlorosilanes composed essentially, by weight, of from 50 to 75% dimethyldichlorosilane, from 1 to 10% trimethyl chlorosilane, from 10 to 35% methyltrichlorosilane, and from about 1 to 10% of a methylchlorodisilane. The methylchlorodisilane (or mixture of methylchlorodisilanes) may be in the form of tetrachlorodimethyldisilane, pentachloromethyldisilane, trichlorodimethyldisilane, dichlorotetramethyldisilane, etc. (including the various isomers thereof), or mixtures of the methylchlorodisilanes either alone or with hexachlorodisilane. Generally these methylchlorodisilanes may comprise from about 1 to as high as 12 to 15% of the mixture of methylchlorosilanes in the starting hydrolysis product.

The intermediate hydrolyzable mixture of methylchlorosilanes contained in the above-mentioned methylchlorodisilane mixture is generally obtained by passing methyl chloride over silicon in the presence of copper at elevated temperatures in the manner disclosed and claimed in Rochow Patent 2,380,995 issued August 7, 1945, and assigned to the same assignee as the present invention. The reaction product thus obtained, in addition to containing the above-described methylchlorosilanes in the stipulated proportions, also contains small amounts of silicon tetrachloride, tetramethylsilane, hexamethyldisilane, methyl-substituted polysilanes (with or without silicon-bonded chlorine) containing more than two silicons attached by silicon-silicon linkages, etc. These latter ingredients are present generally in insignificant amounts and may be removed if desired from the hydrolyzable mixture prior to effecting conversion to the methylpolysiloxane state. The usual methods of hydrolysis using water are employed and it is generally desirable to neutralize the acidic hydrolysis product sufficiently to obtain an essentially neutral product. Thereafter, the more volatile components (those generally boiling below 100° C.) such as hexamethyldisiloxane and octamethylcyclotetrasiloxane are advantageously removed from the hydrolysis product because these latter two materials are more useful in the preparation of organopolysiloxane rubbers and lubricating fluids. However, if desired these more volatile components may be permitted to remain in the hydrolysis mixture.

It will, of course, be apparent to those skilled in the art that in addition to the curable organopolysiloxane described above, other organopolysiloxanes or mixtures or blends of these organopolysiloxanes may be employed without departing from the scope of the invention. The use of the particular organopolysiloxane with the stannous gluconate does not appear to be critical as long as it is either a curable material or exhibits equivalent properties. Additional examples of organopolysiloxanes which may be used in the practice of the present invention, particularly with reference to organopolysiloxane resins, may be found described in the above-mentioned Welsh Patent 2,449,572.

The exact formula of the stannous gluconate or active complexes of stannous gluconate employed in the practice of the present invention is not known due to the complexity of the reaction involved. It is believed that these stannous compounds are a mixture of salts and complexes formed from the reaction of the initial reactants required to form the stannous gluconate or complexes thereof. For brevity, the term "stannous gluconate" will be employed hereafter in the description of the invention and in the claims to cover both the non-complexed and the complexed stannous gluconate or mixtures thereof. If a formula had to be assigned, it would probably comprise a compound having the formula

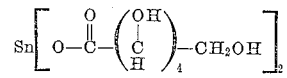

In general, the stannous gluconate may be prepared in any of the many ways apparent to persons skilled in the art. Thus, one may employ stannous hydroxide (preferably freshly prepared) for reaction with the gluconic acid itself, or derivatives thereof, for instance, metallic salts of the gluconic acid or glucono-delta-lactone, reactive with the stannous hydroxide to form the stannous gluconate. When using these reactants, one advantageously employs from 1 to 3 or more moles of the gluconic acid or a derivative thereof per mole of stannous hydroxide. Among the metallic salts of gluconic acids which may be used are for instance the calcium, ferric, zinc, lead, barium, etc., salts of gluconic acid.

Other methods for making the stannous gluconate may be found described in Schmidt et al. Patent 1,893,872, issued January 10, 1933.

The tin in the form of stannous gluconate employed for curing purposes in the present invention is advantageously used as a water solution (e. g., 1 to 20% tin in the solution), since in this form its activity as a curing agent is maintained at a high level for indefinite periods of time.

Attempts to obtain the stannous gluconate as an isolated product by removing the water thereof is undesirable for the reason that the isolated material is extremely hygroscopic and rapidly loses its activity as a curing agent in this state. The employment of the stannous gluconate in the form of an aqueous solution enables one to add the latter to aqueous emulsions or suspensions of the organopolysiloxane more readily because of the miscibility of the aqueous medium of the stannous gluconate with the aqueous medium of the emulsion or suspension.

The amount of stannous gluconate employed may be varied widely depending upon such factors as the application for which the combination of the organopolysiloxane and stannous gluconate is intended, the organopolysiloxane used, etc. Based on the weight of the organopolysiloxane, one may advantageously employ the stannous gluconate in an amount equal to at least 0.5%, by weight, and range as high as 30 to 40%, by weight, of the organopolysiloxane. Alternatively, the tin in the form of the stannous gluconate may comprise, by weight, from about 0.1 to 20% or more, based on the weight of the organopolysiloxane, optimum results generally being obtained in many applications within the range of from about 1 to 6%, by weight, tin. Additional factors in choosing the amount of stannous gluconate will include the medium in which the stannous gluconate will be used, for instance, aqueous or non-aqueous media, the treating conditions including the temperature and time of treatment, organopolysiloxane used, application involved, etc.

The combination of the organopolysiloxane and stannous gluconate may be employed in various media including aqueous and non-aqueous (i. e., organic solvent) media. Thus, if desired the organopolysiloxane may be dissolved in a suitable solvent, for example, toluene, xylene, butanol, etc., and the stannous gluconate added thereto and also caused to dissolve. In some applications, the stannous gluconate may be added directly to the organopolysiloxane especially when the latter is fluid at normal temperatures and this combination used without any further dilution, for instance, with solvents or with water for treating purposes.

A treating medium which permits optimum utilization of the properties of the stannous gluconate and organopolysiloxane is one in which the latter is dispersed in water in the form of an emulsion or an emulsion-dispersion. Such emulsions or emulsion and dispersions are more particularly described in Brown et al. application, Serial No. 415,960 filed concurrently herewith, and assigned to the same assignee as the present invention. Briefly it may be stated that such dispersions or suspensions are usually prepared by forming a mixture of water and the organopolysiloxane in which the latter comprises from about 0.5 to 60% or more of the total weight of the two ingredients, adding an emulsifying agent to the mixture of ingredients, and homogenizing the latter until a suitable emulsion or emulsion-dispersion is obtained employing usual means for this purpose. Among such emulsifying agents may be mentioned, for instance, the sulfonated amide condensation products of fatty acids with organic amines, sulfonated aromatic and mixed alkyl aryl sulfonate derivatives, and sulfonated ester derivatives. Particularly satisfactory ones are "Nilo-SD" which is a mixture of sulfonated fatty acid amides and sulfonamides of the same fatty acids manufactured by Sandoz Chemical Works, New York, New York, and "Pluramine S-100" which is an acid amide condensate, manufactured by Kearny Manufacturing Company, Kearny, New Jersey. The actual amount of emulsifying or dispersing agent employed may be varied widely and generally will comprise from 0.1 to 1%, by weight, based on the weight of the entire treating mixture. It is preferable that the emulsifying agent used be one which maintains maximum stability of the emulsion and permits the deposition of the organopolysiloxane on whatever material desired prior to breaking of the emulsion or dispersion.

In order that those skilled in the art may better understand how the present invention may be practiced, the following examples are given by way of illustration and not by way of limitation. All parts are by weight.

The stannous gluconate employed in the following examples was prepared as follows: a 50% aqueous solution of gluconic acid was mixed with freshy prepared stanous hydroxide. The stannous hydroxide is advantageously obtained by interacting 1 mole of stannous chloride with about 2 moles of aqueous ammonia. The molar ratio of the stannous hydroxide and the gluconic acid was of the order of about 1 to 2. The actual formation of the stannous gluconate is accomplished by adding the flocculent precipitate of stannous hydroxide (while still moist) to the gluconic acid solution. The latter reaction product was employed as the source of stannous gluconate. Additional methods for preparing the stannous gluconate or neutral complex compounds containing stannous gluconate may be found described in the aforesaid U. S. Patent 1,893,872.

EXAMPLE 1

An organopolysiloxane resin was obtained by cohydrolyzing a mixture of ingredients comprising, by weight, 25% methyltrichlorosilane, 30% dimethyldichlorosilane, and 20% diphenyldichlorosilane employing toluene as a solvent and water for hydrolysis purposes in an amount in excess of that required for complete hydrolysis of all the silicon-bonded chlorine atoms. The organopolysiloxane resin was recovered in the form of a 50% solids solution. Employing 10 cc. of the above-identified resin solution, there were added to the latter various organo-metallic salts including iron octoate, zirconium octoate, zinc octoate, stannous gluconate, and stannic gluconate (obtained by interacting stannic hydroxide and gluconic acid in the manner described above) in such an amount that there was present 0.12 gram of the particular metal in the resin solution. Each mixture of resin and curing agent was heated at 150° C. on a cure-testing plate for varying lengths of time to determine which resins because non-tacky and thoroughly cured as evidenced by the fact that a hard brittle state had been attained. As a result of this test, it was found that the resin containing the iron octoate did not cure to the hard brittle state until after 180 seconds at this temperature. For both resin samples containing the zirconium and zinc octoates, at this temperature after 600 seconds, the samples were still tacky and incompletely cured. In contrast to the above, it was found that the resin sample containing the stannous gluconate attained the completely cured, hard, brittle state in 50 to 60 seconds, illustrating clearly the marked cure-accelerating effect of the stannous gluconate as compared with other organometallic salts ordinarily employed for curing organopolysiloxane resins. Of interest is the fact that the stannic gluconate exerted no curing effect on the organopolysiloxane even after 10 minutes at 150° C. illustrating the unpredictable and unexpected qualities of using the stannous salt in place of the stannic salt.

EXAMPLE 2

An emulsion was prepared from a methyl polysiloxane which was obtained by hydrolyzing a mixture of ingredients comprising, by weight, about 5% trimethylchlorosilane, 20% methyltrichlorosilane, 70% dimethyldichlorosilane, and about 4 to 8% of a mixture of chloromethyldisilanes, particularly trichlorotrimethyldisilane and tetrachlorodimethyldisilane. This mixture of chlorosilanes was hydrolyzed with water by a continuous process which is more particularly described in Schwenker patent application Serial No. 281,716 filed April 11, 1952, and assigned to the same assignee as the present invention. The fluid methylpolysiloxane thus obtained was neutralized with solid anhydrous sodium carbonate and filtered. Thereafter, this material was treated to remove most of the low boiling materials, for instance, octamethylcyclotetrasiloxane, hexamethyldisiloxane, etc. The stripped material (that boiling essentially below essentially below 100° C.) amounted to about 10 to 15% of the weight of the hydrolysis product. The methylpolysiloxane fluid thus obtained was found to have a viscosity of about 90 to 100 centistokes. An emulsion was prepared from this material as follows: To an emulsified mixture (using an Eppenbach Homomixer) composed of 20 grams water, and 3 grams of an emulsifying agent, specifially Nilo-SD (described above) was added 30 grams of the above-described methylpolysiloxane fluid together with one gram of oleic acid. After homogenization, an additional 46 grams of water was added and the mixture of ingredients further homogenized to give a stable emulsion. An additional amount of water was added to this latter emulsion to give an organopolysiloxane content of about 2½%, by weight, of the total treating emulsion. Thereafter, stannous gluconate was added to the emulsion in such quantity that there was present 4% tin based on the weight of the organopolysiloxane. Additional emulsions were prepared with the exception that in place of the stannous gluconate there were used, by weight, based on the weight of the methylpolysiloxane, 8% zirconium as zirconium acetate, or 4% tin as stannic gluconate, or 8% zinc as zinc acetate, or 8% lead as lead acetate.

In each of the above silicone water-repellent compositions were immersed 8" x 8" squares of cotton cloth, rayon cloth, and nylon cloth, and in some instances cloth compoesed of 50% acetate and 50% rayon gabardine (three samples of each cloth) for about 30 seconds, the samples withdrawn and run through a padder or quetch adjusted to a pressure of about 45 to 60 lbs. in order to remove excess treating solution, the immersion in the silicone water-repellent composition and the passage through the padder being carried out three times on each piece of cloth in order to insure complete impregnation of the cloth. The cloths were then hung in a 150° C. air-circulating oven for about 10 minutes to dry and to effect cure and conversion of the methylpolysiloxane. After removal from the oven and cooling to room temperature, each sample was rinsed in warm water for about five minutes and then dried at about 75° C. for about 45 minutes. Each sample of treated cloth was then conditioned in the air for about 30 minutes and thereafter subjected to spray rating tests similar to those described in the 1953 Technical Manual and Yearbook of the American Association of Textile Chemists and Colorists, volume 29, pages 146 to 147 (Standard Test Method 22–52). The dry cleaning tests were conducted in accordance with the directions found in the same yearbook on page 106 (Tentative Method 25–52) but omitting the soap; thereafter the spray ratings were conducted in the same way on the dry cleaned samples. The headings "C," "R," "N," "50/50 AR" are intended to refer to cotton cloth, rayon cloth, nylon and the acetate rayon cloths, respectively. A spray rating of about 80 or above is considered satisfactory. If the spray rating dropped to 70 for two consecutive dry cleanings, the tests were discontinued.

*Table I*

| Metallic Salt and Concentration | Initial Spray Rating | | Durability Spray Rating After Dry Cleaning | | | | | | |
|---|---|---|---|---|---|---|---|---|---|
| | | | 1 | 2 | 3 | 4 | 5 | 6 | 7 |
| 4% Tin as Stannous Gluconate. | C | 80 | 80 | 80 | 80 | 80 | 80 | 80 | |
| | R | 90+ | 80 | 80 | 80 | 80 | 80 | 80 | |
| | N | 100 | 80 | 80 | 80 | 80 | 80 | 80 | |
| | 50/50 AR | 80 | 80 | 80 | 80 | 80 | 80 | 80 | |
| 4% Tin as Stannic Gluconate. | R | 0 | | | | | | | |
| | 50/50 AR | 0 | | | | | | | |
| 8% Zirconium as Zirconium Acetate. | C | 80 | 80 | 70 | 70 | | | | |
| | R | 80 | 80 | 70 | 70 | | | | |
| | N | 90 | 70 | 70 | | | | | |
| | 50/50 AR | 80 | 70 | 70 | | | | | |
| 8% Zinc as Zinc Acetate. | C | 50 | | | | | | | |
| | R | 70 | | | | | | | |
| | N | 50 | | | | | | | |
| 8% Lead as Lead Acetate. | C | 80 | | | | | | | |
| | R | 0 | | | | | | | |
| | N | 50 | | | | | | | |

It is obvious from the above table that stannous gluconate is superior to the other salts as a silicone curing agent and has the additional advantage of pH stability. Moreover, it is also shown that 4% of the tin metal (based on the weight of the methylpolysiloxane) is better than 8% of the zirconium, zinc, or lead metals and that durabilities as far as dry cleaning cycles are concerned are better than those using the other salts for curing purposes. The above table also shows the unexpected effect of using a very similar salt, namely, stannic gluconate, which in place of the stannous gluconate did not exert any apparent curing action on the methylpolysiloxane as evidenced by the lack of water-repellency.

EXAMPLE 3

Three emulsions were prepared similarly as described in Example 2 with the exception that the emulsion contained 1%, by weight thereof, of a mixture of organopolysiloxanes, 50% of which was the same methylpolysiloxane recited in the above Example 2, and the other 50% was a trimethylsilyl chain-stopped methyl hydrogen polysiloxane similar to that described in the aforementioned Wilcock Patent 2,491,843 (the mixture may comprise from 2 to 75%, by weight, of the methyl hydrogen polysiloxane, based on the weight of the latter and the methylpolysiloxane free of hydrogen). One emulsion contained 8% zirconium in the form of zirconium acetate, another emulsion containing 4% zinc in the form of zinc acetate, and the third emulsion contained 4% tin in the form of stannous gluconate, the weight of each metal being based on the weight of the methylpolysiloxane mixture. Cotton and rayon squares were treated similarly as was done in Example 2 and spray ratings were determined in the same manner. As a result of these tests, it was found that the cotton and rayon cloth treated with the emulsion containing the stannous gluconate as a curing agent had initial spray ratings of 100 and these spray ratings were of the order of 80 to 90 even after several dry cleanings. In contrast to this, the cloth treated with the emulsion containing the zirconium acetate had an initial spray rating for cotton of 80 and for rayon 85 and these spray ratings dropped to 70 after the first dry cleaning. The tests on the cloth treated with the emulsion containing the zinc acetate as the curing agent showed that the cotton initial spray rating was 50 and the rayon initial spray rating was 80, and the latter spray rating dropped to 70 after the first dry cleaning.

In the treatment of textiles to render the latter water repellent, various resins are often incorporated in the treating mixture, particularly aminoplast resins such as urea-formaldehyde resins. The following example illustrates the use of such a treating mixture.

EXAMPLE 4

In this example, there was prepared an organopolysiloxane emulsion of the same type as that described in Example 3 but containing, in addition to the ingredients of the latter emulsion, a water-soluble, curable, urea-formaldehyde resin (Rhonite 610 made and sold by Rohm and Haas Company) in an amount equal to 18% of the total weight of the emulsion. For purposes of accelerating the cure of the urea-formaldehyde resin, there was also incorporated 1%, by weight, based on the weight of the latter, of an organic amine hydrochloride recommended for this specific purpose. One other modification was made of the emulsion, namely, 7% tin in the form of stannous gluconate was employed as a curing agent for the mixture of the methylpolysiloxane and methyl hydrogen polysiloxane present in the emulsion, in place of the 4% tin used as the curing agent in Example 3. Cotton, rayon, and nylon cloth squares were treated with the respective emulsion similarly as was done in Example 2, each treated cloth was dried, and spray ratings determined on each sample employing the test procedure described in the aforementioned Example 2. As a result of these tests, it was found that the initial spray rating for the cotton cloth was 95, for the rayon 100 and for the nylon 100; none of these spray ratings decreased below 80 even after several dry cleanings.

The stannous gluconate can be used in aqueous systems over any pH range and if dispersed in non-aqueous resin type systems still maintains its activity. Moreover, its rapidity of cure when combined with certain silicone resins is clearly brought out in the foregoing examples, this being an additional unexpected advantage of using the stannous gluconate as a curing agent especially when contrasted with the inability of a similar salt, stannic gluconate, to effect any cure of the organopolysiloxane. The importance of stannous gluconate as a curing agent for silicone water-repellent compositions to be applied to textile materials is emphasized by the fact that when using certain aminoplast resins, such as water-soluble, incompletely condensed melamine-formaldehyde resins and urea-formaldehyde resins in combination with these silicone textile emulsions, it is found that the use of tin salts, other than stannous gluconate, is unsatisfactory due to the inability of the aminoplast resins, particularly the urea-formaldehyde resins to neutralize the acidic tin salts because these resins have too weak a basicity to counteract the acidity of the catalyst and this results in undesirable tenderizing of the cloth. Thus, the need for water-soluble tin salts which are stable and can cure organopolysiloxanes at neutral pH's are important; and such a need is fulfilled by the use of the stannous gluconate.

It will, of course, be apparent to those skilled in the art that in addition to the organopolysiloxanes described in the foregoing examples, other organopolysiloxanes including organopolysiloxanes containing silicon-bonded hydrogens, many examples of which have been given previously, may be employed without departing from the scope of the invention. The presence of vinyl or allyl groups attached directly to the silicon atoms in the organopolysiloxane is not precluded. Moreover, mixtures of organopolysiloxanes, for instance mixtures of methylpolysiloxanes and methyl hydrogen polysiloxanes for various purposes, particularly in treating textiles to render them water repellent, are included within the invention.

Obviously other types of aminoplast resins in addition to the urea-formaldehyde resin described in one of the foregoing examples, for instance water-soluble, curable melamine-formaldehyde resins (e. g., trimethylol melamine, hexamethylol melamine, etc.), dimethylol urea, etc., may also be employed without departing from the scope of the invention. Advantageously, the aminoplast resin is present, by weight, in an amount equal to from 3 to 25% or more of the total weight of the treating emulsion or dispersion. It has been found unexpectedly that the concomitant presence of the aminoplast resin and the organopolysiloxane in the emulsion imparts to cloth treated therewith improved "hand" or "feel" even when the cloth may be rendered less flexible due to the presence of large amounts of the cured aminoplast resin on the cloth.

In addition to the emulsions or dispersions described in the foregoing examples, other emulsions in varied proportions may also be employed. A range of ingredients found advantageous in preparing these emulsions comprises by weight, (1) from 0.1 to 50 percent of the curable organopolysiloxane (preferably from 0.5 to 20 percent of the organopolysiloxane), (2) from 50 to 99.5 percent water, and (3) the stannous gluconate whose tin ion is advantageously present, by weight, in an amount equal to from 0.1 to 20% of the weight of the organopolysiloxane, the sum of the ingredients equalling essentially, 100%. Obviously, small amounts of the usual ingredients employed to make emulsions or dispersions, such as emulsifying agents, colloid protectors, etc., may be added. To these emulsions or dispersions may be added the above-mentioned aminoplast resins which should be water soluble for optimum miscibility or water-dispersible, and which may be in various states of incomplete cure.

The curable organopolysiloxane compositions herein described containing the stannous gluconate as the curing agent can be employed in various applications. Thus, these resinous materials may be used for coating and insulating purposes for conductors, as protective surfaces in high temperature applications especially when there is incorporated in the organopolysiloxane resin heat-resistant fillers such as finely divided aluminum pigment, etc. Other organopolysiloxane fluids within the scope of the invention can be employed with the stannous gluconate curing agent for treating leather to render the same water repellent as is more particularly described in the patent application of Edgar D. Brown, Serial No. 409,001— filed February 8, 1954, and assigned to the same assignee as the present invention. The treatment of various cellulosic materials with organopolysiloxane fluids containing stannous gluconate as the curing agent for such fluids to improve the anti-sticking properties of the treated cellulosic material to materials which normally adhere thereto, is more particularly disclosed and claimed in the above-mentioned Brown et al. patent application, Serial No. 415,960, filed concurrently herewith. By reference, the latter Brown et al. application is intended to be included as part of the disclosures in the instant application for the purpose of showing a further use of stannous gluconate as a curing agent for organopolysiloxane fluids in applications wherein cellulosic materials are treated for the above-identified purpose.

What I claim as new and desire to secure by Letters Patent of the United States is:

1. A composition of matter comprising a curable organopolysiloxane in which the organic groups are selected from the class consisting of monovalent hydrocarbon radicals and halogenated monovalent hydrocarbon radicals attached to silicon by carbon-silicon linkages, and a curing agent therefor comprising a tin compound obtained by reacting stannous hydroxide and gluconic acid.

2. The heat-treated product of claim 1.

3. A composition of matter comprising (1) a curable methyl phenylpolysiloxane containing an average from about 1 to 1.8 total methyl and phenyl groups and (2) a curing agent for (1) comprising a tin compound obtained by reacting stannous hydroxide and gluconic acid.

4. The heat-treated product of claim 3.

5. A composition of matter comprising (1) a curable methylpolysiloxane containing an average from about 1 to 1.8 methyl groups per silicon atom and (2) a curing agent for (1) comprising a tin compound obtained by reacting stannous hydroxide and gluconic acid.

6. The heat-treated product of claim 5.

7. A composition of matter comprising (1) a curable methylpolysiloxane obtained by hydrolyzing a mixture of ingredients comprising, by weight, from 50 to 75% dimethyldichlorosilane, from 1 to 10% trimethylchlorosilane, from 10 to 35% methyltrichlorosilane and from 1 to 10% of a methylchlorodisilane, and (2) a tin compound obtained by reacting stannous hydroxide and gluconic acid.

8. The heat-treated product of claim 7.

9. A composition of matter comprising (1) a curable methylpolysiloxane mixture composed of (a) a methyl polysiloxane resin containing an average of from about 1 to 1.8 methyl groups per silicon atom and (b) a methyl hydrogen polysiloxane, and (2) a curing agent for the aforesaid methyl polysiloxane mixture comprising a tin compound obtained by reacting stannous hydroxide and gluconic acid.

10. The heat-treated product of claim 9.

11. An aqueous emulsion containing as active ingredients (1) a curable organopolysiloxane in which the organic groups are selected from the class consisting of monovalent hydrocarbon radicals and halogenated monovalent hydrocarbon radicals attached to silicon by carbon-silicon linkages, and (2) a curing agent for (1) comprising a tin compound obtained by reacting stannous hydroxide and gluconic acid.

12. An aqueous emulsion as in claim 11 in which the organopolysiloxane is a methyl polysiloxane containing an average of from about 1 to 1.8 methyl groups per silicon atom.

13. An aqueous emulsion comprising, by weight, (1) from 0.1 to 50% of a curable organopolysiloxane in which the organic groups are selected from the class consisting of monovalent hydrocarbon radicals and halogenated monovalent hydrocarbon radicals attached to silicon by carbon-silicon linkages, (2) from 50 to 99.5% water, and (3) from 0.1 to 20% tin in the form of a tin compound obtained by reacting stannous hydroxide and gluconic acid, the tin content being based on the weight of the organopolysiloxane.

14. An aqueous emulsion comprising, by weight, (1) from 80 to 99.5% water, (2) from 0.1 to 20% of a methylpolysiloxane obtained by hydrolzing a mixture of methylchlorosilanes composed essentially, by weight, of from 50 to 75% methyldichlorosilane, from 1 to 10% trimethylchlorosilane, from 10 to 35% methyltrichlorosilane, and from 1 to 10% of a methylchlorodisilane, and (3) a tin compound obtained by reacting stannous hydroxide and gluconic acid whose tin ion is present, by weight, in an amount equal to from 0.1 to 20%, based on the weight of the methylpolysiloxane.

15. An aqueous emulsion comprising, by weight (1) from 80 to 99.5% water, (2) from 0.1 to 20% of a methylpolysiloxane containing on an average of from about 1 to 1.8 methyl groups per silicon atom and (3) a tin compound obtained by reacting stannous hydroxide and gluconic acid whose tin ion is present, by weight, in an amount equal to from 0.1 to 20%, based on the weight of the methylpolysiloxane.

16. An aqueous emulsion comprising, by weight, (1) from 80 to 99.5% water, (2) from 0.1 to 20% of a mixture of methylpolysiloxanes composed of (a) a methyl hydrogen polysiloxane and (b) a methylpolysiloxane consisting solely of methyl groups, and silicon and oxygen atoms and containing an average of from about 1 to 1.8 methyl groups per silicon atom and (3) a tin compound obtained by reacting stannous hydroxide and gluconic acid whose tin ion is present, by weight, in an amount equal to from 0.1 to 20%, based on the weight of the mixture of methylpolysiloxanes.

17. An aqueous emulsion as in claim 15 in which there is incorporated a curable aminoplast resin selected from the class consisting of melamine-formaldehyde resins and urea-formaldehyde resins.

18. An aqueous emulsion comprising, by weight, (1) from 80 to 99.5% water, (2) from 0.1 to 20% of a methylpolysiloxane obtained by hydrolyzing a mixture of methylchlorosilanes composed essentially, by weight, of from 50 to 75% dimethyldichlorosilane, from 1 to 10% trimethylchlorosilane, from 10 to 35% methyltrichlorosilane, and from 1 to 10% of a methylchlorodisilane, (3) from 3 to 25% of a water-soluble, incompletely condensed urea-formaldehyde resin, and (4) a tin compound obtained by reacting stannous hydroxide and gluconic acid whose tin ion is present, by weight, in an amount equal to from 0.1 to 20%, based on the weight of the methylpolysiloxane, the sum of the ingredients equalling essentially 100%.

19. The method for curing a heat-curable organopolysiloxane in which the organic groups are selected from the class consisting of monovalent hydrocarbon radicals and halogenated monovalent hydrocarbon radicals attached to silicon by carbon-silicon linkages, which comprises incorporating therein a curing agent comprising a tin compound obtained by reacting stannous hydroxide and gluconic acid, and thereafter heating the resin for a time and at a temperature sufficient to effect the desired cure.

20. The method as in claim 19 in which the organopolysiloxane is a methylpolysiloxane containing an average of from about 1 to 1.8 methyl groups per silicon atom and the tin ion of a tin compound is present, by weight, in an amount equal to from 0.1 to 20% of the weight of the methylpolysiloxane.

References Cited in the file of this patent

UNITED STATES PATENTS

| | | |
|---|---|---|
| 2,588,365 | Dennett | Mar. 11, 1952 |
| 2,727,875 | Mack et al | Dec. 20, 1955 |